April 17, 1928.
J. JORDEN
1,666,600
POWER OPERATED WRENCH
Filed March 13, 1926
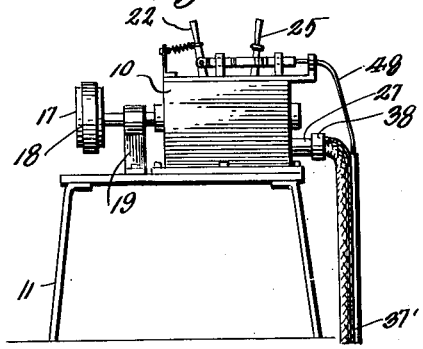
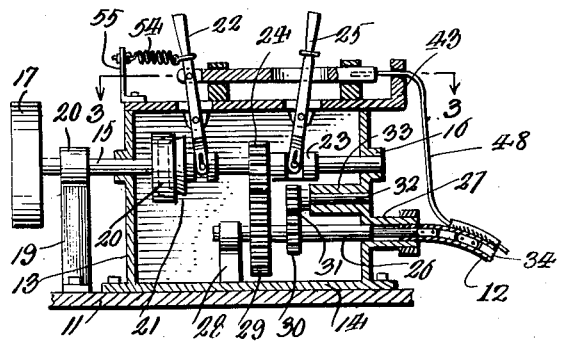
WITNESSES
Inventor
JOHN JORDEN
By Richard B. Owen
Attorney Patented Apr. 17, 1928.

1,666,600

UNITED STATES PATENT OFFICE.

JOHN JORDEN, OF OAKLEY, KANSAS.

POWER-OPERATED WRENCH.

Application filed March 13, 1926. Serial No. 94,613.

The present invention relates to inventions in a power operated wrench and has for its prime object to provide a power operated wrench of a comparatively simple and durable design.

A further object of the invention is the provision of a power operated wrench of a conveniently operable character whereby mechanical elements of various types may be readily engaged for connection or disconnection.

A still further object of the invention is the provision of a power operated mechanism which may be readily utilized for drilling and similar purposes.

Still another object of the invention is the provision of a power operated mechanism of the above character which may be very easily and accurately controlled.

Other objects and advantages of the invention will become apparent as the description progresses.

In the accompanying drawing forming a part of this specification and in which like reference characters are employed to designate corresponding parts throughout the same:

Figure 1 is a side elevational view of the assembled structure embodying my invention, Figure 2 is an enlarged longitudinal sectional view through the transmission mechanism of the invention, Figure 3 is a top plan view of the transmission mechanism, and Figure 4 is an enlarged sectional view of the wrench connecting structure and control mechanism.

In the drawing, wherein for the purpose of illustration is shown the preferred embodiment of my invention, the numeral 10 generally indicates in its entirety the transmission mechanism of my improved apparatus, preferably supported in an elevated position upon a stand 11. Operatively connected with the transmission mechanism 10 and extending substantially therefrom is a flexible drive member 12 connecting at its outer free end with a suitable operating tool.

Referring more specifically to the construction embodying my invention, it will be readily noted from the drawing, that the transmission mechanism 10 is enclosed in a rectangular shaped casing 13 preferably of durable metallic construction having a flanged bottom plate 14 apertured for fastening upon the stand 11. Rotatably mounted in an elevated position in the center of the casing 13 is a main drive shaft 15, composed of a pair of aligned relatively movable sections supported in bearings 16 formed in the ends of the casing. The rear section of the shaft 15 projects substantially from the casing and carries on its outer end a pulley wheel 17 rigidly secured to the shaft. This pulley wheel is adapted to engage a drive belt 18 trained over a complementary pulley driven by an electric motor or other source of power. In order to prevent undue vibration of the drive shaft projection, a bracket 19 is secured to the stand 11 and provided at its upper end with a bearing sleeve 20, arranged adjacent the casing 13 to provide an auxiliary bearing member.

Carried by the interior portion of the shaft 15, upon the adjacent ends of its complementary sections, is a clutch mechanism embodying a circular recessed member 20 fixed to one section of the shaft and engageable with a complementary member 21 movable on the adjacent shaft section. The movable member of the clutch is slidably actuated on the shaft by means of a fulcrumed clutch lever 22 pivotally connected at its intermediate portion with an ear formed on the casing top, and arranged to project through a slot therein. The upper end of this lever is formed to provide a convenient handle, while the lower end is provided with a forked extension carrying pins adapted to engage an annular groove formed in the movable clutch member for convenient operation thereof. From this construction it is apparent that the main shaft 15 is driven by means of the belt 18 from a suitable source of power. Operation of the clutch mechanism controls the rotary movement of the rear drive shaft section, and, ultimately, the operation of the tool.

Slidably mounted on the forward section of the drive shaft 15 is a gear sleeve 23 engageable with suitable keys formed on the shaft and provided with an annular groove at its intermediate portion. The rear end of this sleeve is secured to or formed integral with a toothed drive gear 24, rotatable with the shaft. This mechanism is also slidably actuated on the drive shaft by a lever 25, similar in construction to the clutch operating lever, and pivotally mounted in a similar manner.

Rotatably mounted in the casing in a position below the drive shaft 15 is an auxiliary shaft 26, having its forward end journaled in a tubular extension 27 formed on the front of the casing and its rear extremity journaled in a bearing bracket 28 secured to the bottom of the casing and projecting vertically therein. This auxiliary shaft carries a complementary large spur gear 29 adjacent its rear end, directly engageable with the gear 24 mounted on the upper shaft, and a smaller spur gear 30 arranged forwardly of the larger gear. This smaller spur gear 30 is continuously in mesh with an idler gear 31 provided with a forwardly projecting shaft 32 rotatably supported in an inwardly directed bearing sleeve 33. This gear construction is adapted to permit clock-wise or counter-clock-wise rotary movement of the auxiliary shaft 26 so as to permit right and left rotary operation of the tool member.

Operatively connected with the forward projecting end of the auxiliary shaft 26 and extending substantially therefrom is a flexible operating shaft 34 preferably formed of a series of links connected by universal joints. The free end of this shaft connects with a rod section 35 having its outer projecting end formed to provide a non-circular projection 36, preferably being square or hexagonal in form. The flexible operating shaft 34 is covered by a flexible tube 37, firmly secured at its ends with retaining collars 38 to prevent displacement.

The non-circular projection of the bar 35 is removably connected with a coupling sleeve 39, preferably having a knurled outer surface for convenient handling. This coupling sleeve is formed with a non-circular bore for engagement with a socket wrench 40, the shank of this wrench being provided with a non-circular extension engageable with the bore of the coupling sleeve for detachable connection of the wrench.

The top of the casing is enclosed by a removable top plate 41 apertured for insertion of suitable machine screws and provided upon its longitudinal center with slots 42 for projection of the operating levers 22 and 25. Formed integral with and extending forwardly from the front edge of the cover 41 is an angular bracket 43 apertured adjacent its upper end, the purpose of which will be presently described. Rigidly secured upon the cover 41 and arranged in longitudinal aligned positions are a pair of brackets 44 provided with openings adjacent their upper ends and adapted to slidably support a control bar 45. The intermediate portion of this bar is expanded to form a longitudinal slot 46, while the rear end is bifurcated as at 47 for pivotal connection with the operating lever 22.

Formed integral with or secured to the flexible covering tube 37 is an auxiliary tube or casing 37', of decreased diameter adapted to form a housing for a flexible operating rod 48. One end of the flexible rod 48 is durably connected with the forward extremity of the control bar 45 while the opposite end thereof projects through the outer end of the casing 37'. Fixed to the tube 37 adjacent its outer free end is a sleeve 49 having a slot 50 formed on one side thereof. A pair of parallel ears 51 are formed adjacent the outer end of the sleeve 49 and are apertured for pivotally supporting an operating lever 52. This lever is provided with an angular extension 53 which is pivotally connected with the flexible rod 48. From this construction, it is apparent that the rear end of the control bar 45 is pivotally connected with the control lever 22 while the forward control lever 25 projects through the slot 46 therein. Operative movement of the control bar 45, through the instrumentality of the flexible rod 48, will swing the clutch lever for operative movement of the clutch mechanism without interfering with the position of the reverse gear lever 25. The control bar 45 is normally urged to its rearward position for disconnection of the clutch by means of a coiled tension spring 54, one end of which is secured to the lever 22 while the opposite end is connected to an angular bracket 55. This bracket is bolted or otherwise fastened to the rear edge of the casing cover 41 and thereby maintains the spring 54 in position. Thus, it is obvious, that the tension spring 54 normally tends to swing the lever 22 for disconnection of the clutch and consequently this connection of the transmission mechanism. To produce operative movement of the transmission mechanism and wrench, it is merely necessary that the operator press the lever 52 inwardly toward the sleeve structure 49 thereby drawing forwardly the flexible rod 48 and control bar, for swinging the clutch lever and maintaining the clutch in operative relation.

It is readily apparent, from the foregoing description and the drawing, that a simple and compact power wrench has been devised. This wrench is primarily intended for rapid removal or connection of bolts and nuts in the construction and repair of motor vehicles and various types of machine structures. The nature of the construction will readily permit application of the wrench upon machine elements in various positions and the simple control mechanism insures convenient operation. Attention is invited to the fact that the provision of the coupling sleeve 39 and detachable connection of the wrench 40 will permit the attachment of drilling tools or other implements of this nature to effect operations of a varied character.

It is to be understood that the form of my invention herewith shown and described is to be taken as the preferred example of the same, and that various changes as to the size, shape and arrangement of parts may be resorted to without departing from the spirit of the invention or the scope of the subjoined claims.

Having thus described my invention, I claim:

1. In a power wrench of the character described, a power transmission mechanism, a clutch structure associated with said mechanism for starting and stopping the same, a flexible power cable operated by said mechanism, a pivotally mounted lever controlling said clutch structure, a reciprocable bar mounted adjacent said clutch lever having one end pivotally connected thereto, a flexible control cable connected to the other end of said bar and extending along said flexible power cable to a point adjacent the free end of the same, and means at the free end of said flexible power cable for pulling the control cable to throw the clutch lever into clutch engaging position.

2. In a power wrench of the character described, a power transmission mechanism, a clutch structure associated with said mechanism for starting and stopping the same, a flexible power cable operated by said mechanism, a pivotally mounted lever controlling said clutch structure, a reciprocable bar mounted adjacent said clutch lever having one end pivotally connected thereto, a flexible control cable connected to the other end of said bar and extending along said flexible power cable to a point adjacent the free end of the same, means at the free end of said flexible power cable for pulling the control cable to throw the clutch lever into clutch engaging position, and resilient means attached to said clutch control lever and maintained under tension during the engagement of said clutch for causing disengagement of said clutch upon the release of said control cable.

3. A power wrench structure of the character described including a transmission housing, a transmission mechanism within said housing, a flexible power cable connected with said mechanism, clutch control means for said mechanism and means for transmitting power to the flexible cable, a control means for said clutch mechanism, comprising a pivoted lever, a pair of supporting elements upon said casing, a longitudinally shiftable bar carried by said supporting element and having one end pivotally attached to said clutch control lever, a flexible control cable attached to the other end of said bar, means carried upon said flexible power cable adjacent the free end of the same, for pulling upon said control cable to shift the bar, and a spring member having one end fixed and the other end connected to said clutch control lever and normally acting to pull the lever to clutch disengaged position.

4. In a power wrench of the character described, including a flexible power cable designed to receive a chuck upon the free end thereof, a control means for a reciprocable clutch actuating lever comprising a sleeve member secured about said flexible cable adjacent the free end thereof and having a portion of the wall thereof cut away and provided with a pair of spaced apertured ear members, a lever member having one end pivotally mounted between said ears and having an obtusely angled extension formed integral with the pivoted end thereof and projecting into said sleeve, and a flexible control cable having one end secured to said angled extension and having the other end thereof connected to said reciprocable clutch lever controlling member to shift the member upon the depression of the sleeve carried lever.

In testimony whereof I affix my signature.

JOHN JORDEN.